(12) United States Patent
Hersent

(10) Patent No.: US 6,985,564 B1
(45) Date of Patent: Jan. 10, 2006

(54) MULTIMEDIA DATA TRANSMISSION SYSTEM

(75) Inventor: Olivier Hersent, Caen (FR)

(73) Assignee: Netcentrex, Caen (FR)

( * ) Notice: Subject to any disclaimer, the term of this patent is extended or adjusted under 35 U.S.C. 154(b) by 0 days.

(21) Appl. No.: 09/441,057

(22) Filed: Nov. 16, 1999

(30) Foreign Application Priority Data

Nov. 23, 1998 (FR) .................................. 98 14719

(51) Int. Cl.
 *H04M 1/64* (2006.01)
(52) U.S. Cl. .................................. 379/88.17; 370/466
(58) Field of Classification Search ............ 379/88.13, 379/88.14, 88.17, 207, 93.12, 93.25, 100.11, 379/900; 707/10, 102; 709/217, 228
See application file for complete search history.

(56) References Cited

U.S. PATENT DOCUMENTS

| | | | | |
|---|---|---|---|---|
| 5,594,789 A | * | 1/1997 | Seazholtz et al. | 379/88.02 |
| 5,727,048 A | * | 3/1998 | Hiroshima et al. | 379/93.12 |
| 6,041,411 A | * | 3/2000 | Wyatt | 713/200 |
| 6,097,943 A | * | 8/2000 | Nordwall | 455/418 |
| 6,167,253 A | * | 12/2000 | Farris et al. | 455/412.2 |
| 6,243,443 B1 | * | 6/2001 | Low et al. | 379/88.17 |
| 6,404,876 B1 | * | 6/2002 | Smith et al. | 379/218.01 |
| 6,445,776 B1 | * | 9/2002 | Shank et al. | 379/88.1 |
| 6,449,260 B1 | * | 9/2002 | Sassin et al. | 370/270 |
| 6,760,758 B1 | * | 7/2004 | Lund et al. | 709/217 |
| 2001/0036255 A1 | * | 11/2001 | Reformato et al. | 379/88.01 |

FOREIGN PATENT DOCUMENTS

| | | |
|---|---|---|
| EP | 0 808 048 | 11/1997 |
| WO | WO 94/11981 | 5/1994 |
| WO | WO 98/44714 | 10/1998 |

* cited by examiner

*Primary Examiner*—Fan Tsang
*Assistant Examiner*—Ming Chow
(74) *Attorney, Agent, or Firm*—Gottlieb, Rackman & Reisman, P.C.

(57) ABSTRACT

A distributed multimedia data system is provided connected to a wide area network, the confidentiality and security of which are not controlled from end to end. The system has at least one customer server located at each one of a plurality of service suppliers, each customer server being connected to the wide area network also connected to a shared voice resources and/or video resources host server receiving particular service requests from customers also connected to the wide area network and initially responding to each received particular service request to determine the particular service supplier concerned as to the received particular service request, and to then direct each particular received service request to the at least one customer server located at the concerned particular service supplier for execution of particular service logic associated with the services provided by that service supplier.

15 Claims, 3 Drawing Sheets

MULTIMEDIA DATA TRANSMISSION SYSTEM

TECHNICAL FIELD

This invention relates to a multimedia data transmission system.

STATE OF PRIOR ART

Conventional multimedia servers are designed to be accommodated on a single platform. Usually, they consist simply of an application that runs on a computer equipped with interface cards to the telephone network.

In its most widely distributed form, a host server is capable of finding data on external data servers accessible through the same LAN, using RPC (Remote Procedure Call) or ODBC (Open DataBase Connectivity) type protocols.

This type of structure is suitable for the accommodation of simple multimedia servers in which there is no dynamic information. A company that would like to have a server accommodated describes the required service logic (if the user types #1, " you typed 1" . . . should be displayed) statically, and this logic runs on the service supplier accommodation platform independently.

On the other hand, it becomes impossible to accommodate an application that requests information that necessitates close integration with one of the company's vital databases (booking statements, etc.), and the company must equip itself with its own infrastructure.

More and more companies would like to integrate this type of multimedia service more closely with internal data in their industrial process. The objective is to inform the customer in real time if the ticket that he has just purchased is available, the value of his share portfolio, etc. These are dynamic data that are only available within the company.

Conventional multimedia accommodation services are not capable of satisfying these requirements, such that requesting companies are obliged to install their own server with the associated investments (private telephone exchange, telephone lines, etc.).

In order to overcome the disadvantages of this type of server, the invention proposes a multimedia data transmission system, the purpose of which is to provide a dynamic multimedia service for companies who would like it, without obliging the company to purchase any hardware and while making a server accessible to the company using several technologies (particularly from the telephone network and from the Internet network), with fully transparent service logic.

DESCRIPTION OF THE INVENTION

The system according to the invention relates to a multimedia data transmission system characterized in that it comprises a WAN, in which the confidentiality and security are not controlled from end to end, onto which a shared voice and/or video resources host server designed to provide a dynamic service to at least one user, and at least one customer server located at each service supplier are connected.

Advantageously, the host server connected to the network through an interface is composed of five subsystems:
A protocol stack subsystem with an interface that:
  receives calls from the data network at the exchange;
  detects incoming calls and captures caller and called party numbers;
  detects dial tones;
  generates coding-decoding media data streams;
  receives media coding-decoding data streams.
A command interpreter subsystem capable of:
  generating messages on detection of new calls to a customer server placed at a customer;
  generating event messages;
  making use of commands originating from the customer servers:
    order to play a pre-recorded audio or video file,
    order to synthesize a voice message starting from a text,
    order to start waiting for a dial tone,
    order to disconnect the call,
    order for voice recognition or other application.
A high performance transcoding resource subsystem.
A voice synthesis and/or video resource subsystem.
An audio or video sequences recording/reproduction module subsystem.
Advantageously, each customer server is software that receives events signaled by the host server and sends commands in reaction to these events. This software can run on a computer equipped with two network interfaces, one connected to the WAN to communicate with the host server, and the other connected to a company private network in order to dialog with databases and other industrial processes belonging to the customer.

Thus, a new generation "accommodation" service can be provided in which all expensive resources (voice synthesis cards, etc.) are shared, while the customer maintains control over the application and can interface it with whatever resources he wishes.

DETAILED PRESENTATION OF AN EMBODIMENT

Figure 1:
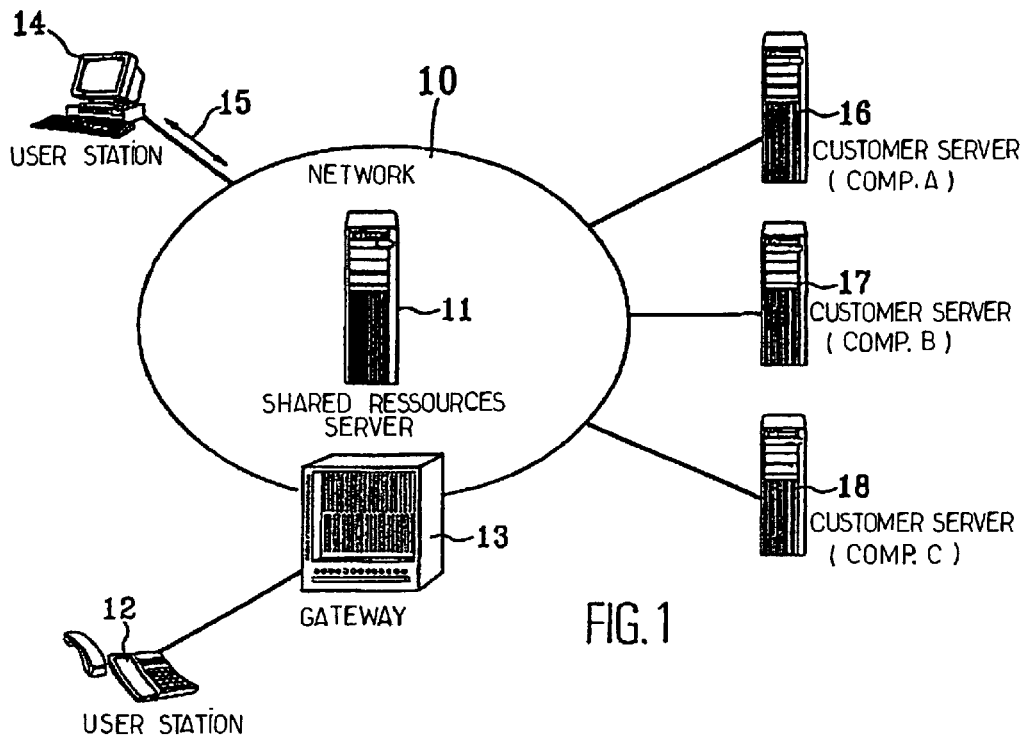
FIG. 1 illustrates a first embodiment of the invention.

The invention relates to a multimedia data transmission system that comprises a WAN, which may or may not be public, on which the confidentiality and security are not controlled from end to end, and onto which a shared voice and/or video resources host server is connected and provides a dynamic service to at least one customer, and onto which at least one customer server located at each customer is also connected.

The invention consists of placing a voice resource in the WAN (capable of reproducing audio files, recording them, performing synthesis or voice recognition, detecting DTMF (Dual Tone MultiFrequency) tones from two sounds, equipped with a protected protocol that can remote control it from a wide area network (such as the Internet network).

The application that controls this voice resource may be located anywhere on the network. Thus, the server is a distributed platform in which expensive resources are located in the network, and in which the service (software only) is located at the customer.

Therefore, the invention can be used to share the voice resource host server located in the network of an operator between several customers that execute the service logic in their premises. The companies simply need to have a connection with the data network. The host server is accessible either from multimedia stations connected to the data network, or from any telephone through a gateway.

With the invention, the supplier of the "accommodation" service provides call control software to his customers, who run it locally on a machine in their network, and interface it with their critical databases.

When a call arrives for this customer, it reaches the shared voice resource platform. This platform analyzes the requested number or the "ALIAS" for IP (INTERNET PROTOCOL) calls and deduces the client concerned. It sends a new call notification through the WAN to the call control application (customer server) for the customer concerned. In particular, this application may ask the following in return:

play a prerecorded audio file;
synthesize a text;
record a text;
ask for a video sequence to be sent if the connected person has an appropriate terminal;
make a voice recognition.

The voice resource can be made above the H.323 protocol so that users can be connected through the switched telephone network (through an STN/IP gateway), or through the Internet network, indifferently.

In one advantageous embodiment, the host server is connected to the WAN through an Ethernet or other interface, and is composed of five subsystems:

A first subsystem, which is an H.323 protocol stack, for which the API (Application Programming Interface) is capable of:
  detecting incoming calls and capturing the caller and called party numbers (or H.323 ALIAS);
  detecting DTMF tones (transported in the H.245 protocol);
  generating media data streams (sound+video) with coding-decoding;
  receiving media data streams (sound+video) with coding-decoding;

Possibly a second subsystem, which is a high performance transcoding resource, typically a digital signal processor card capable of transcoding the G.711/G.723.1 protocols.

Possibly a third subsystem which is a voice synthesis resource generating G.711 or G.723.1 type data streams, possibly with "streaming" capacities (division of a large file into successive small elements with limited duration).

Possibly a fourth subsystem, which is an audio and video sequence recording/reproduction module with "streaming" functions during reproduction.

The action of these subsystems is coordinated by a fifth subsystem which is essentially a command interpreter capable of:

generating new call detection messages to a customer server placed at a customer; it must also choose the right customer server starting from the called number;
generating event messages, for example corresponding to DTMF tones;
implementing commands from customer servers, such as:
  order to play a prerecorded audio or video file,
  order to synthesize a voice message from a text,
  order to go in waiting for a DTMF dial tone,
  order to disconnect the call,
  order for voice recognition or other application.

Calls from the switched telephone network are translated by an STN network/H.232 gateway for processing by the host server. The gateway function may possibly be integrated in the host server.

Other subsystems (voice recognition, fax generation/reception, etc.) may be added to increase the functional richness of the complete assembly.

In one advantageous embodiment, the customer server is simple software (for example "Window NT" service) that receives events signaled by the host server and sends commands in reaction to these events. This software may run on a computer provided with two network interfaces, one connected to the Internet network to communicate with the host server, and the other connected to a company private network to dialog with databases and other industrial processes within the company.

The host computer is configured so as to not transmit IP packets from the Internet network to the internal network.

The customer can configure the service logic itself using a script language (for example Java Script, VisualBasic), or a graphic interface.

The dialog protocol may be any secure dialog protocol with short waiting times. In one embodiment, a protocol is used on a standard UDP in which each information block sent is in the following form:

<block><random><64 random bits></random><cipherblock>
encrypted data</cipherblock> </block>

The encrypted information block must have the following structure once it has been decrypted:

<clearinfo>
<serial>serial number</serial>
<other information> . . . <other information>
</clearinfo>

Information encrypted in the "cipherblock" block is obtained by encrypting the "clearinfo" structure using the DES (Data Encryption Standard) standard in CBC (Cipher Block Chaining) mode, using the 64 random bits for the initial exclusive OR. The sender's identity is proven by the possibility of finding an intelligible message with decryption. The receiver must memorize the last serial number received from the sender and discard any message received with a serial number less than or equal to the current serial number.

The sender can protect his transmission (UDP standard) by sending several identical messages. The receiver memorizes the serial number of the first correctly received message and discards subsequent messages without examining them.

FIG. 1 illustrates a first example use, which is for the communication by an IP interactive voice server.

A WAN network 10, for example Internet, in which the voice and/or video resource host server 11 is connected to:
an ordinary telephone 12 through a WAN telephone gateway 13;
a multimedia station 14 through a two-directional link 15, of the H.323, SIP, or other type of voice data stream;

three customer servers 16, 17 and 18 for companies A, B and C.

When the host server 11 receives a new communication from a user, the first thing it does is to analyze the called number and then deduces which company server should manage the communication; for example customer server 16 for company A.

Company A makes fast part orders. Customer server 16 sends its welcome announcement stored in the welcome file in the host server 11: "welcome to company A's fast order server, please press on the '*' key to begin". Informed users can interrupt this announcement by pressing on the '*' key.

As soon as the user presses on '*', the host server 11 informs company A's customer server 16 with a "DTMF event" message. Company A's customer server 16 then begins to play the "Do_you_want_to_order" file which contains a recording of this phrase.

Company A's customer server 16 decides to use the voice command, to order the host server 11 to start recognition on the "yes, no" vocabulary. As soon as the user says "yes", the customer server 16 is informed by a "Word_recognition" message.

Customer server 16 then asks how many parts the customer wants to order and records this number by voice recognition. It then stops the voice recognition procedure by a "Stop_recognition" command.

Finally, the customer server 16 repeats the amount of the order to the customer asking the host server 11 to synthesize the "You have ordered three parts" character string. The user then hangs up.

Figure 2:
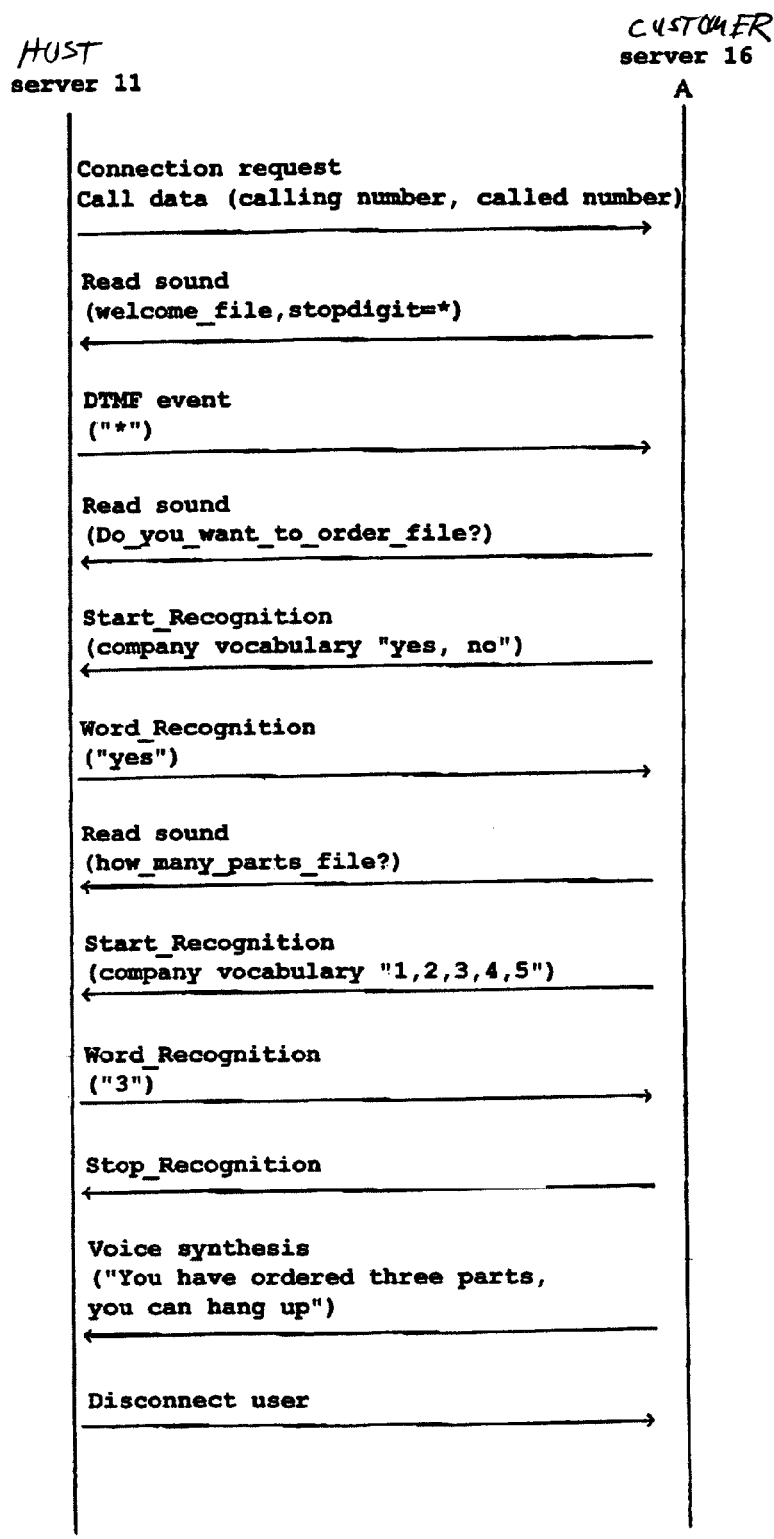
FIG. 2 illustrates the dialog between a host server with voice recognition and the customer server belonging to company A.

The dialog between the host server 11 with voice recognition which receives an H.323, SIP or other voice data stream and company A's customer server 16, is illustrated in FIG. 2.

Figure 3:
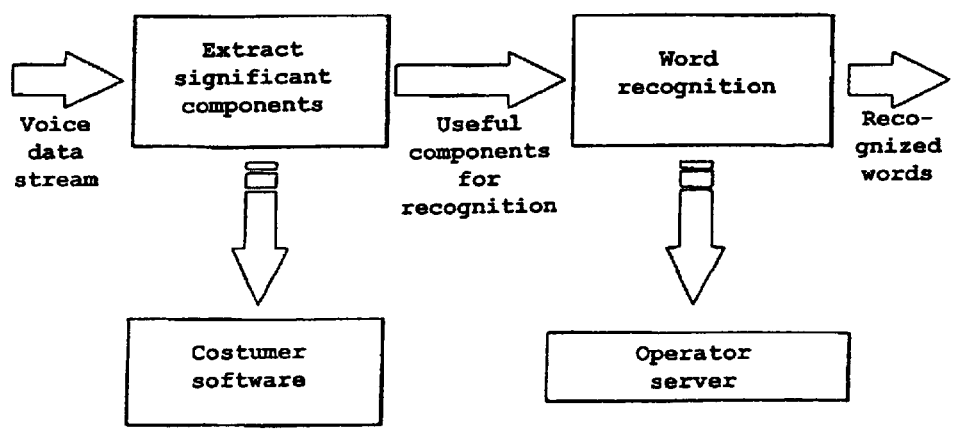
FIG. 3 illustrates an example of a voice recognition procedure.

Voice recognition procedures usually comprise two parts as illustrated in FIG. 3:
the first part (A) uses the voice data stream (64 kbits for standard G.711 and 6.4 kbits for standard G.723.1) and extracts significant components from it (spectrum, etc.), the result is a low rate data stream between 4 and 8 kbits/s;
the second part (B) attempts to recognize words in a vocabulary starting from components transmitted by the first part A.

The scheme illustrated in FIG. 3 shows how the different modules of a voice recognition procedure communicate with each other.

There are two ways of creating a voice recognition procedure in the IP interactive server:
When the user who is calling the customer server is not controlled by the network operator, the A and B components have to be put on the host server. This is the method used in the above example.
However, if the network operator can, it is better to extract significant components at the user in order to make less use of the passband on the network between the user and the host server. This extraction phase requires very little calculation power.

For example, if the user is an IP telephony software, the significant components extraction module may appear like a new speech encoder. The host server then negotiates with the user for use of this encoder during the connection.

Another possible embodiment is to put a software component in a specialized displayed HTML page (ActiveX or Java) that interfaces with voice resources on the user station and only sends significant components of the voice data stream to the host server. Thus, a specialized page can be created which reacts to voice, as in the example in FIG. 3.

Figure 4:
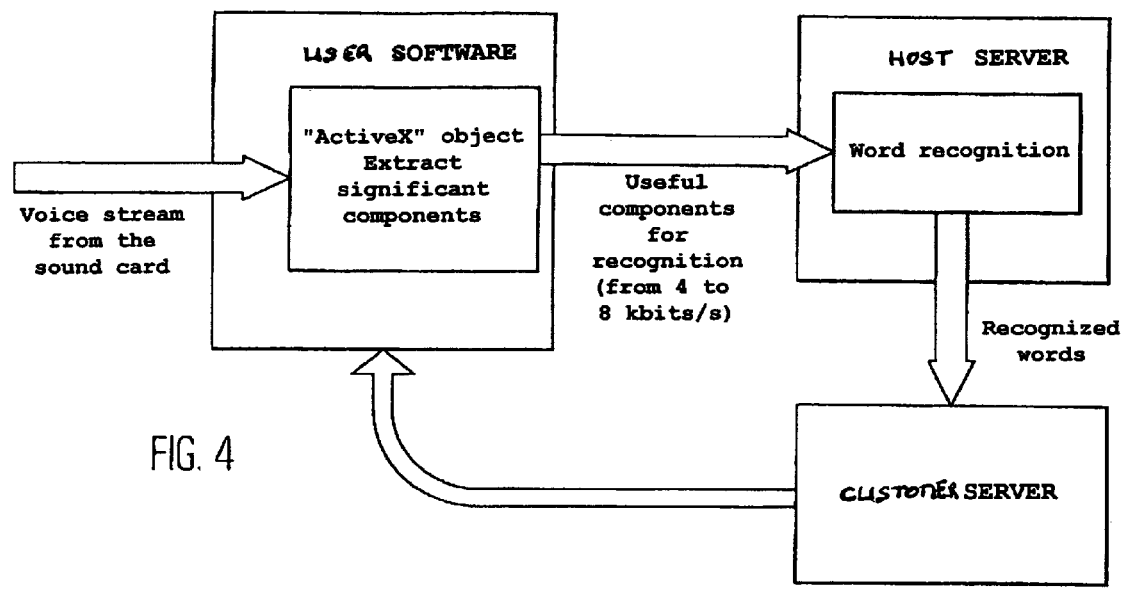
FIG. 4 illustrates an embodiment of a specialized page that reacts to voice.

FIG. 4 illustrates another possible example embodiment with the IP audiotel server, for a specialized page that reacts to voice.

In this example embodiment, the user is a software object ("ActiveX or Java") integrated in a specialized page. This object sends significant voice data stream components input on the user station computer to the host server. It can do this using the RTP protocol on the IP network, or simply the TCP protocol if the reaction time is not a major constraint.

The host server recognize words in this data stream and informs the customer server of recognized words.

The customer server then initiates actions as a function of the recognized words. For example, it can send a command message to the ActiveX component to display another specialized page.

The following protocol is used:
1. Connection request: Connection request message (host server =>customer server)
   (Implicit in TCP/IP by opening the exchange mechanism in TCP/IP)
2. Call data: Transmit call data (host server =>customer server)
   Called number
   Calling number
3. Read sound: Read a sound file (customer server =>host server)
4. DTMF event message (host server =>customer server)
   Logical channel number
   DTMF key code
5. Sound recording: Recording of a message (customer server =>host server)
   Channel number
   Name of the element to which the response is to be notified
   Time before beginning the recording.
   Name of the message save file
   End of recording character
   Maximum recording time
   Maximum silence time
   Save file format
   Data format
   Sampling frequency
   Send a beep to signal when the recording starts
6. Send tone: Send a tone (customer server =>host server)
   Name of the element to which the response is to be notified
   TimeBefore
   Dial Tone
   Frequency 1
   Frequency 2
   Amplitude 1
   Amplitude 2
   Tone duration
7. Read chain: Concatenate a string of characters (customer server =>host server)
   Logical channel number
   Name of the element to which the response is to be notified
   Time before reading sound
   Character string, for which the data =>sound conversion is to be made
   End of file character string
   Sound file format (Wav, Vox, ADPCM . . . )
   Data format
   Sampling frequency format Mix size, so that two files can be mixed later (Smooth transition)

Breakdown type, which will be used later for number generation time functions starting from a sound library Character used to separate expressions in the character string File name resulting from the concatenation Word field name Sound field name Dictionary access path 8. Disconnect user: The caller hung up (host server =>customer server)

Logical channel number to be disconnected (Implicit in TCP/IP by closing the TCP/IP exchange mechanism)

9. Disconnect server: Disconnection request by the company server software (customer server =>host server) Logical channel number to be disconnected 10. Voice synthesis:

Logical channel number

Name of the element to which the response is to be notified

Text to be converted in voice synthesis

Choose a specific voice, if required

Speaking speed

Speaking frequency

. . .

11. Extended call (function of the call transfer request)

Logical channel number

Name of the element to which the response is to be notified

Transfer request time

Number to which the call is to be transferred

Call type

Number of rings before abandon

Time to analyze the result of the transfer request

12. Start recognition (function requesting beginning of voice recognition)

Logical channel number

Name of the element to which the response is to be notified

Name of the words file to be analyzed

Digit used to detect the end of the sound file

Maximum recording time

Maximum silence time

Send a "beep" signaling the beginning of the recording

13. Stop recognition (function requesting the beginning of voice recognition)

Logical channel number

14. Word recognition (function requesting the beginning of voice recognition)

Logical channel number

Name of the element to which the response is to be notified

List of recognized words

We will now describe several other example embodiments.

Call from the Telephone Network

A person who would like to book a journey calls 0836011234. This number actually connects to an STN/H.323 network gateway that converts the call into IP data and sends it to the host voice resources server.

The host voice resources server analyzes the requested number and deduces that the call must be controlled by the customer server located at the IP address 192.12.13.14 (located in the travel agent).

Therefore, it sends a new call message to the travel agent's customer server. This customer server asks it to play a musical background quickly presenting the company and asking the caller to press "1" to book a voyage, or "2" to leave a message.

The person presses "1" and the host voice resources server retransmits the event to the travel agent's customer server.

The dialog continues. It could be imagined that the travel agent would like to announce the price of a particular voyage. The customer server looks in the travel agent's database for prices and availabilities, and asks the host voice resources server to play the recorded string "the price of your voyage is", and then to synthesize "2345" and then play "Francs".

Call from the Internet Network

An H.323 terminal clicks on a link starting from a travel agent's Internet site, provoking a call from the H.323 terminal to the H.323 host server. The host server analyzes the called number and sends an indication for the new call to the travel agent's customer server.

The travel agent's call control server does not need to be modified, and can execute the same scenario as in the previous case.

But it can also choose to offer more services, since a protocol element informs it at the time of the indication of the new call that the call is incoming from the Internet network, it can suggest that a specific page should be viewed, or even give the order to the host server to play a video sequence describing a particular voyage.

The call is free for the Internet network user.

Call from Another Country

If the operator has installed another host voice resources server in another country, the travel agent may be accessible from this country. The operator simply reserves a number that is forwarded to the local host voice resources server, the host server continues to contact the company's customer server. The source of the call is indicated when a new call indication is received so that the customer server can dynamically adapt to the most suitable language when it is helpful to do so.

This solution is much less expensive than a conventional solution, since no international voice communication is necessary.

What is claimed is:

1. A distributed multimedia data system, comprising: a network;

at least one customer server located at each one of a plurality of service suppliers, each customer server being configured to be connected to the network; and a shared resources host server connected to the network, comprising means for communicating through the network with a plurality of user stations by means of man-machine interface resources shared among the customer servers, and configured, to receive therefrom service requests from users also connected to the network, and to initially respond to each received service request to determine the service supplier concerned therewith, and to then direct each received service request to the at least one customer server at the concerned service supplier for execution of a respective service logic associated with services provided thereby, and executed at said service supplier to exchange information by means of the shared man-machine interface with the user station from which said one of the service requests has been received; and wherein the shared resources host server is connected to the network through an interface and includes:

a protocol stack subsystem with an interface that:
receives calls from a data network at an exchange:
detects incoming calls and captures caller and called party numbers: detects dial tones:
generates coding-decoding media data streams: and
receives media coding-decoding data streams: a command interpreter subsystem that:
generates messages on detection of new calls to each customer server: generates event messages; and
uses the commands from the customer servers.

2. The system according to claim 1, further comprising a high performance transcoding resource subsystem.

3. The system according to claim 2, further comprising a thesis and/or video resources subsystem.

4. The system according to claim 3, further comprising or video sequences recording/reproduction module subsystem.

5. The system according to claim 1, wherein each server is provided as software running at each one of the plurality of service that receives events signaled by the shared resources host server and commands in reaction to these events.

6. The system according to claim 5, wherein the software is running on a computer at each one of the plurality of service suppliers, the computer being provided with two network interfaces, one network interface being connected to the network to communicate with the shared resources host server and the other network interface being connected to a company private network in order to dialog with customer databases.

7. The system according to claim 1, wherein the shared resources within the host server include a voice recognition means operating on input data representing voice parameters calculated in a user's station.

8. The system according to claim 1, wherein the network is an IP network.

9. The system according to claim 1, wherein the shared resources within the host server include voice resources.

10. The system according to claim 1, wherein the shared resources within the host server include video resources.

11. A shared resources host server for accessing a plurality of customer services through a telecommunications network comprising:

interface means for connection to the network;

means for communicating through the network interface means with a plurality of customer servers respectively managing said customer services;

means for communicating through the network interface means with a plurality of user stations, by means of man-machine interface resources shared among the customer servers;

means for processing service requests received from the user stations to identify a respective customer server for which each service request is intended;

means to notify each one of the service requests to the customer server identified therefore;

means responsive to a service logic executed at said identified customer server to exchange information by means of the shared man-machine interface with the user station from which said one of the service requests has been received, and a protocol stack subsystem that:
receives calls from a data network at an exchange:
detects incoming calls and captures caller and called party numbers: detects dial tones:
generates coding-decoding media data streams: and
receives media coding-decoding data streams: and a command interpreter subsystem that:
generates messages on detection of new calls to each customer server: generates event messages: and
uses the commands from the customer servers.

12. The shared resources host server according to claim 11, wherein the means for communicating with user stations include voice recognition means operating on input data representing voice parameters calculated in one of the user stations.

13. The shared resources host server according to claim 11, wherein the man-machine interface resources include voice recognition and voice synthesis resources.

14. The shared resources host server according to claim 11, wherein the man-machine interface resources include video resources.

15. The shared resources host server according to claim 11, wherein the means for communicating with the customer servers are arranged to provide ciphered communications with said customer servers over the network.

* * * * *